United States Patent

[11] 3,590,230

[72] Inventor Walter R. Nordquist
Naperville, Ill.
[21] Appl. No. 813,213
[22] Filed Apr. 3, 1969
[45] Patented June 29, 1971
[73] Assignee Bell Telephone Laboratories, Incorporated
Murray Hill, N.J.

[54] FULL ADDER EMPLOYING EXCLUSIVE-NOR CIRCUITRY
5 Claims, 1 Drawing Fig.

[52] U.S. Cl. .......... 235/176, 307/216
[51] Int. Cl. .......... G06f 7/50, H03k 19/32
[50] Field of Search .......... 235/176; 307/216

[56] References Cited

UNITED STATES PATENTS

| | | | |
|---|---|---|---|
| 3,001,711 | 9/1961 | Frohman | 235/176 |
| 3,074,640 | 1/1963 | Maley | 235/176 |
| 3,196,261 | 7/1965 | Schaefer | 235/176 |

OTHER REFERENCES

Jen, IBM TECHNICAL DISCLOSURE BULLETIN, " Inverse Exclusive-OR Circuit," Vol. 8, No. 8, Pub. 1-1966, pp. 1156— 1157.

Sylvan, ELECTRONICS, " Exclusive-OR Circuit Requires No Voltage Supply," Pub. 4-18-1966, pp. 94—95

*Primary Examiner*—Malcolm A. Morrison
*Assistant Examiner*—Jerry Smith
*Attorneys*—R. J. Guenther and Kenneth B. Hamlin

ABSTRACT: A simple, fast, low-power-consumption full adder, suitable for fabrication in integrated circuit form, includes in each stage thereof two identical exclusive-NOR circuits and a three-input variation of the exclusive-NOR circuit.

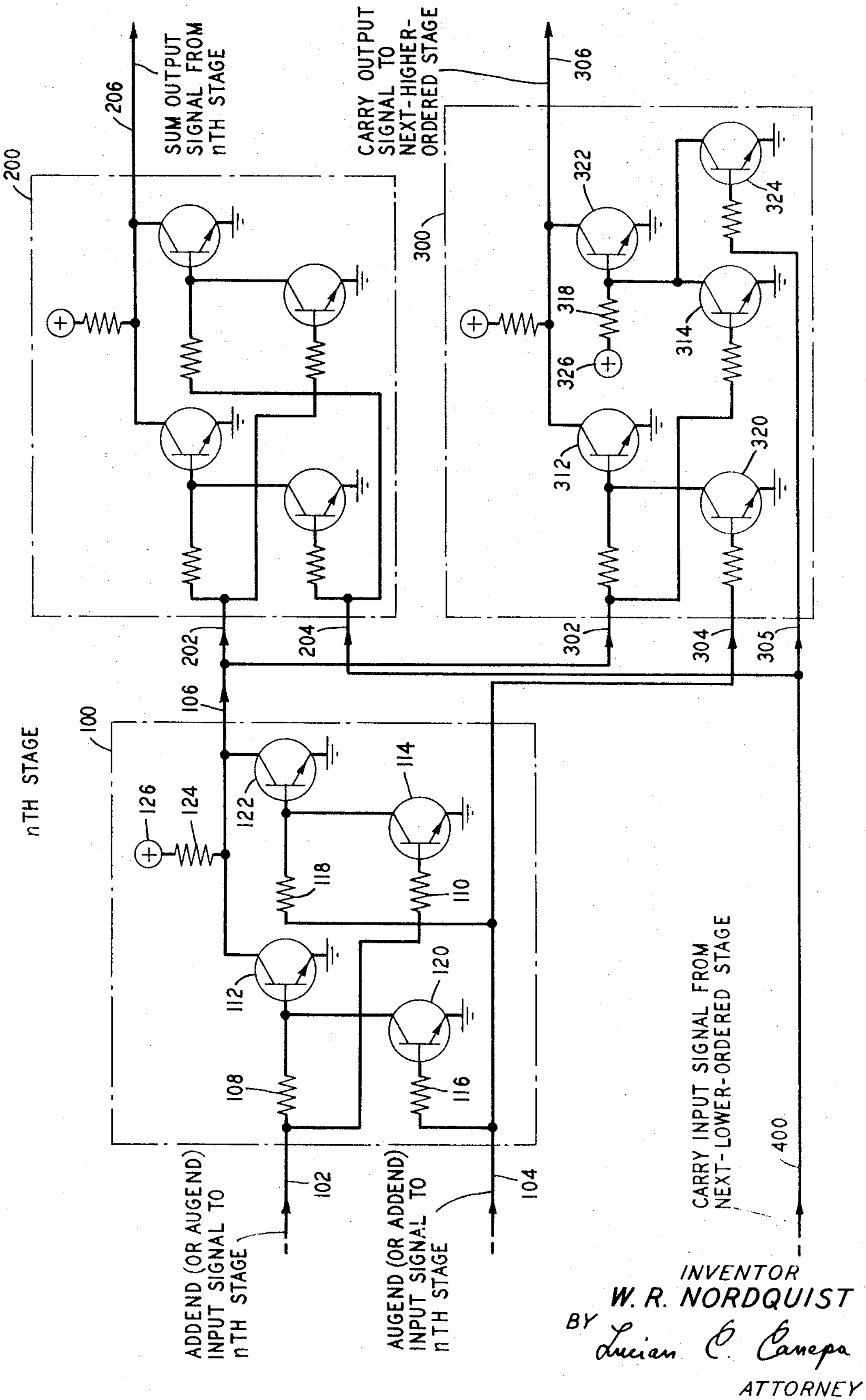
INVENTOR
W. R. NORDQUIST
BY Lucian C. Canepa
ATTORNEY

FULL ADDER EMPLOYING EXCLUSIVE-NOR CIRCUITRY

BACKGROUND OF THE INVENTION

This invention relates to the selective processing of digital information signals and more particularly to a full adder.

The *n*th stage of a multistage binary full adder accepts input signals from three different sources and processes them to provide the output signal pairs 00, 01, 10, or 11 in respective response to whether none, one, two or all three of the input signals are "1's." The input signals, each of which may designate a "1" or a "0," constitute (1) a carry signal from the next-lower-ordered stage of the adder, (2) a signal representative of the *n*th addend digit and (3) a signal representative of the *n*th augend digit. The right- and left-hand digits of each output pair generated by the *n*th stage comprise sum and carry digits, respectively. In turn, the output carry signal and the corresponding next-higher-ordered addend and augend signals of the numbers to be added are applied as inputs to the next-higher-ordered stage.

SUMMARY OF THE INVENTION

An object of the present invention is an improved full adder. More specifically, an object of this invention is a simple, fast, low-power-consumption full adder.

Another object of the present invention is an improved low-cost full adder suitable for fabrication in integrated circuit form.

These and other objects of the present invention are realized in a specific illustrative embodiment thereof each of whose stages comprises two identical exclusive-NOR circuits and a three-input modification of the exclusive-NOR circuit. One of the exclusive-NOR circuits is adapted to receive input signals representative of the *n*-order addend and augend digits. The output of this circuit and a signal representative of the carry generated by the next-lower-ordered stage constitute the inputs to the other exclusive-NOR circuit. The output of this other exclusive-NOR circuit is the sum output signal of the *n*th stage.

The output of the first-mentioned exclusive-NOR circuit is also applied to one of the input terminals of the aforementioned three-input circuit. The other two inputs of the three-input circuit are the next-lower-ordered carry signal and one of the addend and augend signals. In response to these three signals the modified exclusive-NOR circuit generates a carry output signal for application to the next-higher-ordered stage of the full adder.

It is a feature of the present invention that each stage of a full adder include two identical cascaded exclusive-NOR circuits and a three-input variation of the exclusive-NOR circuit.

BRIEF DESCRIPTION OF THE DRAWING

A complete understanding of the present invention and of the above and other objects, features and advantages thereof may be gained from a consideration of the following detailed description of a specific, illustrative embodiment thereof presented hereinbelow in connection with the accompanying single FIGURE drawing which depicts an illustrative adder stage made in accordance with the principles of this invention.

DETAILED DESCRIPTION

Only the *n*th stage of a specific illustrative full adder made in accordance with the principles of the present invention is shown in the drawing. The manner in which a plurality of such stages are connected together to form a full adder is straightforward and will be apparent during the course of the description below.

The depicted *n*th stage comprises three component circuits 100, 200 and 300. The two-input circuits 100 and 200 are identical to each other, whereas the three-input circuit comprises several elements in addition to those included in each of the circuits 100 and 200.

For illustrative purposes each of the circuits 100, 200 and 300 is shown in the drawing as being composed of an interconnected plurality of conventional resistor-transistor logic (RTL) units. Such component units are well known in the art and exhibit advantageous characteristics which dictate their use in many applications of practical interest. Among the advantages of RTL units is their excellent suitability for fabrication in integrated circuit form. Accordingly, the particular adder embodiment shown in the drawing is well suited for fabrication in that form.

The circuit 100 includes two input leads 102 and 104 and a single output lead 106. Signals applied to the lead 102 are coupled via resistors 108 and 110 to the respective base electrodes of npn transistors 112 and 114, whereas signals applied to the lead 104 are coupled via resistors 116 and 118 to the respective bases of NPN transistors 120 and 122. The collector electrodes of the transistors 112 and 122 are connected directly together and via a load resistor 124 to a positive source 126.

In considering the mode of operation of the circuit 100, assume that a relatively high positive voltage is representative of "1" and that a ground or near-ground potential represents a "0."If such a "0" signal is applied to each of the input leads 102 and 104, it is apparent that none of the transistors 112, 114, 120 and 122 is thereby rendered conductive. As a result, the voltage of the output lead 106 is a relatively high positive potential representative of a "1."

If a "1" signal is applied to each of the input leads 102 and 104 of the circuit 100, the transistors 114 and 120 are established in their conducting states. Consequently, the bases of the transistors 112 and 122 are maintained near ground and these latter transistors are accordingly not energized. Under these conditions, the voltage of the output lead 106 is again representative of a "1" signal.

On the other hand, if "1" and "0" signals are applied to the leads 102 and 104, respectively, of the circuit 100, it is evident that the transistors 112 and 114 are energized and that the transistors 120 and 122 are deenergized. As a result of the energization of the transistor 112, the voltage of the output lead 106 is established at a near-ground value representative of a "0" signal. Similarly, if "0" and "1" input signals are respectively applied to the leads 102 and 104, a "0" output signal appears on the lead 106.

A conventional truth table or tabular listing (not shown) relating the various possible input and output signal conditions specified above reveals that the two-input circuit 100 provides on the output lead 106 a signal that is representative of the inverse of the exclusive-OR function of two input variables. This inverse function is referred to herein as the exclusive-NOR operation and for two input variables $a$ and $b$ may be represented by the expression $a\bar{b}+\bar{a}b$. If the basic exclusive-OR function itself is desired, it may be obtained from the circuit 100 simply by applying the signal appearing on the lead 106 to the input of an RTL inverter, As stated above, the composition of the circuit 200 is identical to that of the circuit 100. Hence, the signal provided on the output lead 206 of the circuit 200 is representative of the exclusive-NOR function of signals applied to the two input leads 202 and 204 thereof.

Multiple-input exclusive-OR circuits may be formed by combining in a series or series-parallel arrangement a plurality of exclusive-NOR circuits of the type described above. (In a multiple-input exclusive-OR circuit an output "1" signal is provided if and only if an odd number of "1" input signals is applied thereto.) Thus, for example, a three-input exclusive-OR circuit is formed by applying two of the inputs to a first two-input exclusive-NOR circuit. In turn the third input and the output of the first circuit are applied as inputs to a second two-input exclusive-NOR circuit. The output of this second circuit is then representative of the exclusive-OR function of the three input signals.

The above-mentioned combining technique is illustrated in the drawing wherein the output of the exclusive-NOR circuit 100 is applied to the input lead 202 of the exclusive-NOR circuit 200. The other input lead 204 of the circuit 200 is directly connected to a third main input lead 400. In accordance with this interconnection pattern there is provided on the output lead 206 of the circuit 200 a signal that is representative of the exclusive-OR function of the three input signals respectively applied to the leads 102, 104 and 400.

Exclusive-OR circuits having more than three inputs can be realized by further combining in a series or series-parallel manner of the type described above. Whenever the number of input variables applied to such an arrangement is even, it is necessary to add a final output inverter to obtain the desired exclusive-OR function.

The third component circuit 300 illustrated in the drawing is a modified version of the exclusive-NOR circuits 100 and 200. As shown the circuit 300 comprises a specific interconnected array of conventional RTL units.

The circuit 300 includes three input leads 302, 304 and 305 and a single output lead 306. The transistors 312 and 320 of the circuit 300 correspond to the transistors 112 and 120 included in the circuit 100. In addition, the transistors 314 and 322 correspond generally to the transistors 114 and 122. In addition, a second controlling transistor 324 is connected to the base of the transistor 322. Also an invariant source 326 (rather than a signal source) is connected to the transistor 322 via a resistor 318.

The inputs to the full adder stage shown in the drawing include addend and augend signals representative of correspondingly ordered binary digits of two multidigit numbers to be added together. These inputs are applied to leads 102 and 104. In addition, a third input, a carry signal from the next-lower-ordered stage of the full adder, is applied to the depicted stage. This input is applied to the lead 400.

One of the outputs generated by the illustrative stage constitutes a carry signal to be applied to the next-higher-ordered stage of the full adder. The other output thereof is a sum signal. These signals appear on the output leads 306 and 206, respectively.

In order to establish a basis for understanding the manner in which the depicted stage generates the required sum and carry output function, let the symbols $A_n$ and $B_n$ represent the *n*th bits of the addend and augend quantities that are to be added. In addition, let $C_{n11}$ represent the carry bit generated in the previous or next-lower-ordered stage of the adder. $S_n$ and $C_n$ are the sum and carry bits, respectively, generated by the *n*th stage.

Assuming that $A_n$ and $B_n$ are respectively applied to the input leads 102 and 104, it is evident in view of the discussion above that the output signal appearing on the lead 106 of the exclusive-NOR circuit 100 may be represented as $A_n \bar{B}_n + \bar{A}_n B_n$ or $\overline{A_n \oplus B_n}$ where $\oplus$ denotes the exclusive OR operation. Therefore, the inputs applied to the leads 202 and 204 of the second exclusive-NOR circuit 200 are $\overline{A_n \oplus B_n}$ and $C_{n11}$, respectively. Hence, the output of the circuit 200 is:

$$\overline{\overline{(A_n \oplus B_n)} \cdot \overline{C_{n-1}} + (A_n \oplus B_n) \cdot C_{n-1}} \qquad (1)$$

reduces to $$(A_n \oplus B_n) \oplus C_{n-1} \qquad (2)$$

Expression (2) is recognized to be a Boolean representation for the sum output signal of a full adder stage. Accordingly, the signal appearing on the output lead 206 of the depicted adder stage is in fact representative of the sum of the applied signals $A_n$, $B_n$ and $C_{n11}$.

The signals applied to the input leads 302, 304 and 305 of the circuit 300 may be represented, respectively, as follows: $\overline{A_n \oplus B_{n1}}$, $B_n$ and $C_{n1}$. In turn the inverse of the response of the circuit 300 to these particular input signals may in a straightforward manner be shown to be represented by the expression:

$$\overline{(A_n \oplus B_n)} \cdot \bar{B}_n + (A_n \oplus B_n) \cdot \overline{C_{n-1}} \qquad (3)$$

In other words, expression (3) is designative of the inverse of the signal appearing on the output lead 306. Since expression (3) is in fact a Boolean representation for the inverse of the carry output signal generated by a full adder stage, it is evident that the output of the circuit 300 is, therefore, actually representative of the carry signal itself.

Thus, in accordance with the principles of the present invention there has been described herein an illustrative stage of a specific full adder constructed of conventional RTL units. The overall simplicity and modular nature of the arrangement are apparent from the drawing. The relatively short propagation paths that exist between the input and output terminals of the depicted arrangement are also evident. This latter characteristic enables an adder enables of such stages to operate in advantageous high-speed manner. Moreover, as previously indicated, the illustrated arrangement is well suited for low-cost fabrication in integrated circuit form.

It is to be understood that the above-described arrangement is only illustrative of the application of the principles of the present invention. In accordance with these principles, numerous other arrangements may be devised by those skilled in the art without departing from the spirit and scope of the invention. For example, although emphasis herein has been directed to the use of RTL units to form the circuits 100, 200 and 300, it is to be understood that the constituent units thereof may be constructed from the basic building blocks of other known logic technologies.

What I claim is:

1. A fuller adder stage responsive to correspondingly ordered addend and augend signals applied to said stage and to a carry signal applied thereto from the next-lower-ordered stage for generating sum and carry signals, said stage comprising;
   first circuit means comprising,
   first, second, third and fourth transistors each having base, emitter and collector electrodes,
   means connecting the emitter electrodes of said transistors to a point of reference potential,
   means for applying said addend signals to the base electrodes of said second and third transistors,
   means for applying said augend signals to the base electrodes of said first and fourth transistors,
   means for rendering nonconductive said second and fourth transistors upon respective conduction of said first and third transistors to the base electrodes of said second and fourth transistors,
   and means connecting the collector electrodes of said second and fourth transistors together and to a source of potential whereby there is provided at the collector electrodes of said second and fourth transistors an output signal that is representative of the exclusive-NOR function of said addend and augend signals;
   second circuit means responsive to said lower-ordered-stage carry signal and to said exclusive-NOR function signal for generating a sum signal;
   and third circuit means responsive to one of said addend and augend signals, to said lower-ordered-stage carry signal and to said exclusive-NOR function signal for generating a carry signal.

2. A stage as in claim 1 wherein said second circuit means comprises first, second, third and fourth transistors each having base, emitter and collector electrodes,
   means connecting the emitter electrodes of said transistors to a point of reference potential,
   means for applying the output signal from said first circuit means to the base electrodes of said second and third transistors,
   means for applying said lower-ordered-stage carry signal to the base electrodes of said first and fourth transistors,
   means for rendering nonconductive said second and fourth transistors upon respective conduction of said first and third transistors, comprising means respectively connecting the collector electrodes of said first and third transistors to the base electrodes of said second and fourth transistors,
   and means connecting the collector electrodes of said second and fourth transistors together and to said source of potential whereby there is provided at the collector electrodes of said second and fourth transistors an output signal that is representative of the sum signal of said addend, augend and lower-ordered-stage carry signals.

3. A full adder stage responsive to correspondingly ordered addend and augend signals applied to said stage and to carry signal applied thereto from the next-lower-ordered stage for generating sum and carry signals, said stage comprising;

first circuit means comprising, first, second, third and fourth transistors each having base, emitter and collector electrodes, means connecting the emitter electrodes of said transistors to a point of reference potential, means for applying said addend signals to the base electrodes of said second and third transistors, means for applying said augend signals to the base electrodes of said first and fourth transistors, means respectively connecting the collector electrodes of said first and third transistors to the base electrodes of said second and fourth transistors, and means connecting the collector electrodes of said second and fourth transistors together and to a source of potential whereby there is provided at the collector electrodes of said second and fourth transistors an output signal that is representative of the exclusive-NOR function of said addend and augend signals;

second circuit means comprising, first, second, third and fourth transistors each having base, emitter and collector electrodes, means connecting the emitter electrodes of said transistors to a point of reference potential, means for applying the output signal from said first circuit means to be base electrodes of said second and third transistors, means for applying said lower-ordered-stage carry signal to the base electrodes of said first and fourth transistors, means respectively connecting the collector electrodes of said first and third transistors to the base electrodes of said second and fourth transistors, and means connecting the collector electrodes of said second and fourth transistors together and to said source of potential whereby there is provided at the collector electrodes of said second and fourth transistors an output signal that is representative of the sum signal of said addend, augend and lower-ordered-stage carry signals;

and third circuit means comprising, first, second, third, fourth and fifth transistors each having base, emitter and collector electrodes, means connecting the emitter electrodes of said transistors to a point of reference potential, means for applying the output signal from said first circuit means to the base electrodes of said second and third transistors, means for applying one of said addend and augend signals to the base electrode of said first transistor, means for applying said lower-ordered-stage carry signal to the base electrode of said fourth transistor, means connecting the collector electrodes of said third and fourth transistors and the base electrode of said fifth transistor together and to said source of potential, means connecting the collector electrode of said first transistor to the base electrode of said second transistor, and means connecting the collector electrodes of said second and fifth transistors together and to said source of potential whereby there is provided at the collector electrodes of said second and fifth transistors an output signal that is representative of the carry signal of said addend, augend and lower-ordered-stage carry signals.

4. A full adder stage responsive to correspondingly ordered addend and augend signals applied to said stage and to a carry signal applied thereto from the next-lower-ordered stage for generating sum and carry signals, said stage comprising;

first circuit means responsive to said addend and augend signals for generating a signal representative of the exclusive-NOR function of said addend and augend signals;

second circuit means responsive to said lower-ordered-stage carry signal and to said exclusive-NOR function signal for generating a sum signal, and third circuit means comprising, first, second, third, fourth and fifth transistors each having base, emitter and collector electrodes, means connecting the emitter electrodes of said transistors to a point of reference potential, means for applying the output signal from said first circuit means to the base electrodes of said second and third transistors, means for applying one of said addend and augend signals to the base electrode of said first transistor, means for applying said lower-ordered-stage carry signal to the base electrode of said fourth transistor, means connecting the collector electrodes of said third and fourth transistors and the base electrode of said fifth transistor together and to a source of potential, means connecting the collector electrode of said first transistor to the base electrode of said second transistor, and means connecting the collector electrodes of said second and fifth transistors together and to said source of potential whereby there is provided at the collector electrodes of said second and fifth transistors an output signal that is representative of the carry signal of said addend, augend and lower-ordered-stage carry signals.

5. A logic circuit comprising a series of $n$ stages, where $n$ is a number greater than 2, each having first and second inputs and an output; each of said stages having means for generating a signal at said output representative of the exclusive-NOR function of signals applied to said first and second inputs; $n+1$ input signal terminals; means individually connecting said first inputs of said stages to respective ones of said $n+1$ input signal terminals; means connecting said second input of the first stage of said series to the remaining one of said input signal terminals; and means connecting said second input of each of the remaining stages of said series to said output of the previous stage; whereby a signal is provided at the output of the last stage of said series representative of the exclusive-OR function of signals applied to said input terminals if $n$ is even, and representative of the exclusive-NOR function of said input terminal signals if $n$ is odd.